May 18, 1937. H. SEEHASE 2,080,972

QUICKLY DEMOUNTABLE LIGHT MOTORCYCLE

Filed May 6, 1933

Hans Seehase.
INVENTOR

Patented May 18, 1937

2,080,972

UNITED STATES PATENT OFFICE 2,080,972

QUICKLY DEMOUNTABLE LIGHT MOTORCYCLE

Hans Seehase, Berlin, Germany

Application May 6, 1933, Serial No. 669,667
In Germany August 24, 1932

4 Claims. (Cl. 180—33)

My invention relates to improvements in light motorcycles and the objects of my invention are:

To provide a light motorcycle detachable in two or more parts, each of which can easily be carried, which does not require a garage, and which can easily be carried through terrain where riding is impossible.

To provide a light motorcycle with a power plant which anyone quickly and without tools can detach from the vehicle, and which is of such light construction that it can be handled even by physically weak or crippled persons.

To provide a light motorcycle of such construction that standard low priced parts such as motor, tank, transmission, etc., can be used without change.

I attain these objects by means as illustrated in the accompanying drawing, forming part of the application, and showing a preferred embodiment of my invention.

Figure 1:
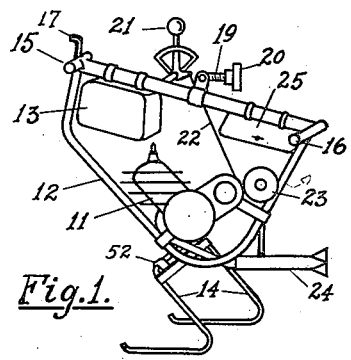
Fig. 1 is a diagrammatic side view of the detachable power plant.

Referring to Fig. 1, the motor 11 is shown supported in a frame 12 which also supports the gasoline tank 13, the frame 12, when not mounted on the motorcycle, is supported by the tipstand 14 which holds the entire power plant in the right height and correct position for direct mounting on the motorcycle. The frame 12 is further made with special supports 15 and 16 and guide 17 which together with the quick locking hinged bolt 19 and nut 20 serve to support and lock the entire power plant to the motorcycle. The members 15 and 16 are short pieces of pipe welded or riveted to the frame transversely at the two upper corners of same. Numeral 17 represents a guide pin welded to said transverse member 15. Further is 21 the gear shifting lever which through the link 22 operates the gear shift, 23 is the driving pulley, 24 the exhaust muffler and 25 the tool box, all of which are supported on the frame 12, thus forming a complete power plant which is easily carried and which may be set up on a table for repair, cleaning, etc.

Figure 2:
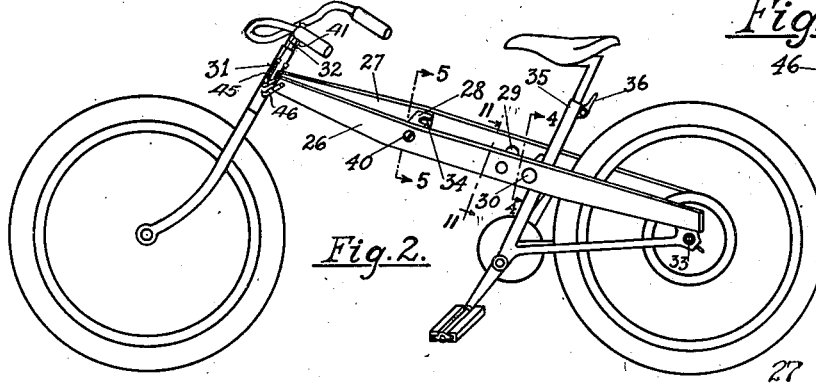
Fig. 2 is a side view in perspective of the bicycle without power plant.

Referring to Fig. 2 it is shown how the main support for the power plant is made up of two substantially rectangular beams 26 and 27, connecting the two wheels and held rigidly together by the angle 28 and cross bar 30. Member 29 is a downwardly directed U-shaped receptacle for the transverse member 16 when the power plant is in place. This receptacle is shown in detail in Fig. 11. The front ends of the beams 26 and 27 are welded to the bearing sleeve 31 of the steering column 32 while the rear ends are rigidly supported on the rear axle 33. Thus together beams 26 and 27 form a rigid frame connecting the front and rear wheels and at the same time act as a support for the power plant which may be quickly attached through the hinged bolt 19 which fits into a slot 34 in the plate 28. For this purpose bolt 19 is hinged at one end while the other end carries nut 20 which serves to tighten up and secure the power plant in place. In Fig. 2 is further shown the saddle support 35 and the quick closing screw lever 36 which enables the rider to rapidly change the saddle position from motorcycle riding to bicycle riding.

Figure 3:
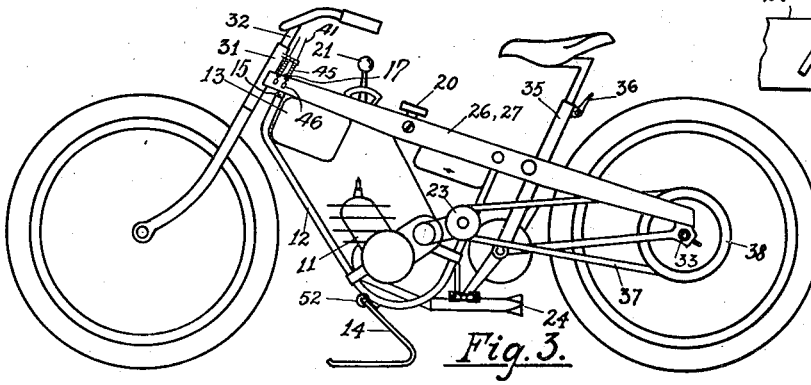
Fig. 3 is a side view of the motorcycle with power plant in place.

In Fig. 3 is shown a side view of the motorcycle complete, mounted with power plant in place. It is further shown how the driving pulley 23 is connected through belt 37 to the driven pulley 38.

In this figure is shown the peculiar method of mounting the power plant which is unique and important in the present case. The motor frame 12 is held tightly up against the beams 26 and 27 by the hinged bolt 19 and nut 20. Forwardly the motor frame 12 is held from moving upward (following the tension of 19) by the transverse member 15 which rests up against the two longitudinal beams 26 and 27 of the body frame. The inside forward extremity of these beams, where same are welded to the sleeve 31 of the steering column, form a receptacle for the guide pin 17 which is forced up between said beams 26 and 27 and slightly forwardly against the sleeve by the tension of bolt 19 which slightly bends the frames together and jams the stops 15 and 16 into a rigid tight connection with the body frame. The guide pin 17 also prevents forward tipping of the power plant during the demounting of same. At its rear end the motor frame 12 is supported against the body frame by the transverse member 16.

Figure 11:
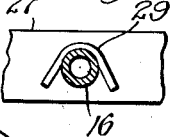
Fig. 11 is a section along line 11—11 in Fig. 2, and shows a cross sectional view of the receptacle for the motor frame cross member located on the inside of the two longitudinal body frame members.

The receptacle 29 consists of an open U-shaped channel, the ends of which have been welded to the two main longitudinal beams 26 and 27 with the opening downward as shown in Fig. 11. When thus the frame 12 holding the power plant is fastened up under said beams 26 and 27 the cross beam 16 will fit snugly into the receptacle 29 and can not move in any direction.

Figure 4:
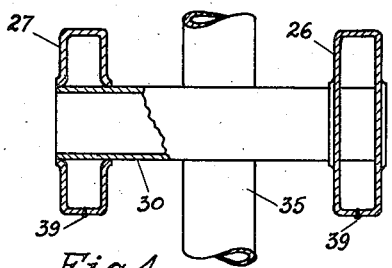
Fig. 4 is a partial section along the line 4—4 in Fig. 2.

In Fig. 4 is shown a section of the main supporting beams 26 and 27 along the line 4—4 in Fig. 2. It is indicated how these beams 26 and 27 are formed of sheet steel with the welded seam 39 downward, the cross bar 30 is brought through the beams 26 and 27 and crimped and welded in place. In the rear is seen the saddle support 35. This special design gives an extremely light, strong and rigid construction which is necessary for the satisfactory functioning of the motorcycle.

Figure 5:
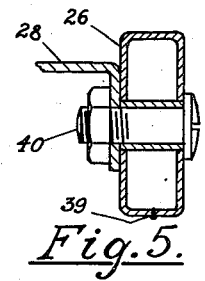
Fig. 5 is a partial section along the line 5—5 in Fig. 2.

In Fig. 5 is shown how the angle 28 which forms a bridge between beams 26 and 27 is supported on either side by a screw 40. To insure the greatest possible strength with minimum weight the beams 26 and 27 are shown with a substantially rectangular section and are designed as beams of equal strength so that the greatest moments of inertia are located where the load is a maximum. To obtain a further reduction in weight the main beams 26 and 27 are so designed that they are considerably strengthened by the frame 12 when this is in place. It is therefore not necessary that the beams 26 and 27 be dimensioned to be of sufficient strength to independently carry the power plant, it is thus possible to obtain a lighter weight for the vehicle when it is to be used as a bicycle without the power plant. The strengthening of the longitudinal beams 26 and 27 is accomplished by the special design of the supports 15 and 16 and guide 17 as shown in Fig. 1. Through the connection and locking of frame 12 to the supporting beams 26 and 27 a unique and extremely rigid frame will result which is capable of supporting the required load.

Figure 6:
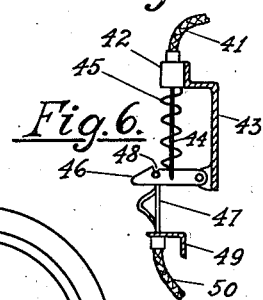
Fig. 6 illustrates the means for quickly detaching operating connections leading to the motor.

In Fig. 6 is shown how the motor regulating connections can be quickly and easily disconnected. The flexible cable 41 which consists of a spring sleeve with a wire 44 drawn through the center is terminated in the bushing 42 supported on bracket 43 which again may be supported on beam 26. The wire 44 is continued through the centre of spring 45 and connected to lever 46 which is held up by spring 45. This lever 46 forms the joint between the two wires 44 and 47, the latter being fastened in a slot 48 in lever 46. At this point therefore the wire 47 may at will be quickly disconnected from the lever 46 thus enabling the motor frame 12 with the entire power plant to be removed from the rest of the vehicle. The continuation of wire 47 leads through cable 50 which is terminated in bracket 49 which again is mounted on the motor frame 12. It is also possible to arrange the joint of these cables in such a manner that it will automatically open up when the motor frame is removed.

Figure 7:
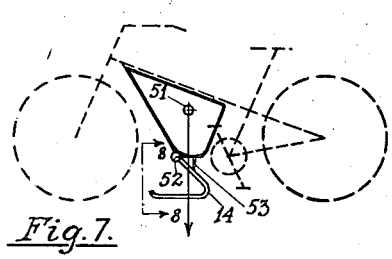
Fig. 7 is a diagram showing the location of the center of gravity of the motorcycle.
Figure 8:
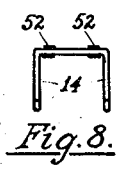
Fig. 8 is a fractional section along the line 8—8 in Fig. 7.

In Fig. 7 is shown in a diagrammatic way how the stability is insured when the power unit is resting on the tipping stand 14. The centre of gravity is located approximately at the point 51 and the entire weight may be thought as directed along the arrow downward from the point 51. The tipping stand 14 is journalled in two bearings 52 and is prevented from tipping the motor backwards by the stop 53. The bearings 52 are located forward of the center of gravity 51 of the power unit. The arrangement of the bearings 52 of the stand 14 is shown in front view in Fig. 8. In the case illustrated the tipping stand 14 is made of one piece of steel pipe of solid rod bent into the desired shape. The motor frame is prevented from tipping forward by the friction in the bearings 52, this friction may be increased at will by tightening the clamping screws of bearings 52.

Figures 9, 10:
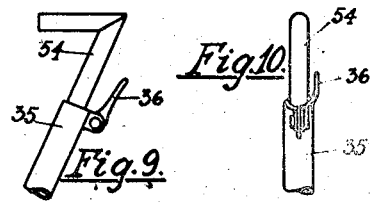
Fig. 9 is a side view of the saddle support.
Fig. 10 is a rear view of the saddle support.

In Figures 9 and 10 is shown the mechanism for rapidly changing the saddle position from motorcycle riding to bicycle riding. The saddle support 35 is slotted in its upper end and furnished with clamping screw and lever 36 so that by a quick turn of the lever 36 the saddle pin 54 is loosened and may be adjusted to the desired position whereupon lever 36 is again turned to tighten up the clamp.

It will be understood by those skilled in the art that my invention may assume varied physical forms without departing from my inventive concept and I, therefore, do not limit my invention to the specific embodiments herein chosen for illustration.

Having thus described my invention what I claim is:

1. A motorcycle consisting mainly of two parts, viz., the vehicle part and the power plant, said power plant with motor, gasoline tank, exhaust muffler, transmission and tool box being mounted in a separate pipe frame detachable from the vehicle part, a single two-legged tip stand journalled in two friction bearings at the lower extremity of said power plant frame, said tip stand supporting the power plant in normal height as when mounted on the vehicle, a stop for limiting backward tilting of said power plant, said supporting friction bearing of the tip stand being located forward from the center of gravity of the power plant with the foot of the tip stand extending to the rear of said center of gravity, the vertical from the center of gravity passing substantially in the middle between the friction bearing and the rear end of the foot of said tip stand.

2. In a demountable light motorcycle, a main girder consisting of a plurality of beams running from the front fork to the rear axle, the cross-section of said girder being variable along its axis to form a structure of equal strength at any point, a complete selfcontained power plant mounted in a separate frame having guide pins and stops fitting into said girder, a locking bolt hinged to said motor frame, a slotted bridge transversely connecting the longitudinal, parallel members of said girder, said locking bolt being slidable into the slot of said slotted bridge whereby said power plant in its frame may be locked to said girder.

3. In a demountable light motorcycle, a main girder consisting of a plurality of tubular longitudinal beams running from the front fork to the rear axle, transverse beams and bridges connecting said tubular beams into one rigid girder, the cross-section of said girder being variable along its axis to form a structure of equal strength at any point, a complete selfcontained power plant mounted in a separate tubular frame having guide pins and stops fitting into said girder, a locking bolt hinged to said tubular frame which thereby may be secured in a hanging position to said girder.

4. A motorcycle of the character described consisting mainly of two parts, viz., the two-wheeled vehicle having a strong, rigid body frame, and the power plant comprising a motor and necessary accessories mounted in a separate supporting frame; a plurality of receptacles for guide pins in said body frame, a centrally located one point supporting bridge, slotted for a hinged locking bolt, rigidly connecting the longitudinal members of said body frame, a quick locking bolt hinged to the upper member of said motor frame whereby said power plant in its frame may be pressed up against said body frame to form one rigid body of greatly increased strength.

HANS SEEHASE.